(12) United States Patent
Kuroda et al.

(10) Patent No.: US 6,564,765 B2
(45) Date of Patent: May 20, 2003

(54) SYSTEM FOR AUTOMATICALLY STOPPING AND STARTING ENGINE VEHICLE

(75) Inventors: Shigetaka Kuroda, Wako (JP); Shigeru Aoki, Wako (JP); Masaaki Kaizuka, Wako (JP); Shunichi Tsuzuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 136 days.

(21) Appl. No.: 09/891,510

(22) Filed: Jun. 27, 2001

(65) Prior Publication Data

US 2002/0017261 A1 Feb. 14, 2002

(30) Foreign Application Priority Data

Jun. 27, 2000 (JP) .......................... 2000-193006

(51) Int. Cl.⁷ .............................................. F02N 17/00
(52) U.S. Cl. .................................. 123/179.4; 307/10.6
(58) Field of Search ........................... 123/179.4, 179.3, 123/198 DB, 198 DC, 493, 332, 333, 198 F; 307/10.6

(56) References Cited

U.S. PATENT DOCUMENTS 4,192,279 A * 3/1980 Maisch et al. ............ 123/198 F
4,362,133 A * 12/1982 Malik ........................... 477/99
4,466,392 A * 8/1984 Uchida et al. ............ 123/179.4
5,458,098 A * 10/1995 Yagi et al. ................ 123/179.3

FOREIGN PATENT DOCUMENTS

JP          10-325346          8/1998

* cited by examiner

*Primary Examiner*—Henry C. Yuen
*Assistant Examiner*—Mahmoud Gimie
(74) *Attorney, Agent, or Firm*—Armstrong, Westerman, & Hattori, LLP

(57) ABSTRACT

A system for automatically stopping and starting an engine of a vehicle which enables proper determination of whether the stopping of the engine is possible, in accordance with the state of a battery. A power brought out from the battery by auxiliaries is subtracted from a power generated by a generator, thereby calculating a difference corresponding to a power for actually charging the battery. By sequentially adding the value, an integrated value of power charged in the battery is calculated. Meanwhile, a value of a known power WBRK consumed by a brake lamp plus a current power consumed by the auxiliaries is multiplied by a beforehand determined target value of idling-stoppage duration, thereby evaluating an evaluated integrated value of power consumed by the battery during stoppage of an idling. If the integrated value is not less than the evaluated integrated value, the stopping of the engine E is permitted.

6 Claims, 6 Drawing Sheets

SYSTEM FOR AUTOMATICALLY STOPPING AND STARTING ENGINE VEHICLE

BACKGROUND OF THE INVENTION

1. Field of the Invention

The present invention relates to a system for automatically stopping and starting an engine of a vehicle, which is designed so that when an engine-stopping condition is established during an idling operation, the engine is stopped to reduce an amount of fuel consumed, and thereafter when an engine-starting condition is established, the engine is started.

2. Description of the Prior Art

Such a system for automatically stopping and starting an engine of a vehicle is known from Japanese Patent Application Laid-open No. 10-325346. This system is designed, so that the stopping of the engine is permitted, when a quantity of power charged in a battery, i.e., a remaining capacity of the battery calculated based on the temperature, voltage and current of the battery, exceeds a sum of a quantity of power required for restarting the engine and a quantity of power required for driving auxiliaries during stoppage of the engine.

The remaining capacity of the battery is varied largely depending on the temperature of the atmosphere and the deteriorated state of the battery. For this reason, it is extremely difficult to accurately detect the remaining capacity with a small error. The above conventional system is designed to determine whether the stopping of the engine is possible, based on remaining capacity of the battery, which is difficult to accurately detect. Therefore, the conventional system is accompanied by a problem that a mis-determination is liable to occur. The conventional system also suffers from the following problem: If a condition for permitting the stopping of the engine is set severely in order to avoid the mis-determination, the stopping of the engine is prohibited even when the battery has enough energy to spare for withstanding the stoppage of the engine. Hence, an effect of sufficiently reducing the amount of fuel consumed is not provided.

The present invention has been accomplished in view of the above circumstance. It is an object of the present invention to ensure that, in a system for automatically stopping and starting an engine of a vehicle, it is possible to properly determine whether the stopping of the engine is possible, in accordance with the state of the battery.

To achieve the above object, according to one aspect of the present invention, there is provided a system for automatically stopping and starting an engine of a vehicle, which is designed so that when a stopping condition for an engine is established, the engine is stopped, and when a starting condition for the engine is then established, the engine is restarted. The system comprises a power difference calculating means for calculating a difference between a power charged in a battery in accordance with the operational state of the engine and a first consumed power brought out from the battery, a charged power integrated value calculating means for calculating an integrated value of the difference calculated by the power difference calculating means, a consumed power integrated value evaluating means for evaluating an integrated value of the first consumed power and a second consumed power brought out from the battery for a target time when the stoppage of the engine has been continued for the target time, a comparing means for comparing the integrated value calculated by the charged power integrated value calculating means with the integrated value evaluated by the consumed power integrated value evaluating means, and a determining means for determining whether the stopping of the engine is possible, based on the result of the comparison in the comparing means.

With the above arrangement, while the differences between the power charged in the battery and the consumed power brought out from the battery are integrated to calculate the integrated value of power charged in the battery, and the integrated value of power brought out from the battery when the stoppage of the engine has been continued for the target time is evaluated. When the integrated value of power charged in the battery is equal to or larger than the integrated value of power brought out from the battery during stoppage of the engine, the stopping of the engine is permitted. Therefore, it is possible to reliably prevent the restarting of the engine from being impossible due to a lack of capacity of the battery after stopping of the engine. As a result, the capacity of the battery can be suppressed to the necessary minimum, and the engine can be stopped as much as possible to preserve fuel. Particularly, the integrated value based on which it is determined whether the stopping of the engine is possible, namely, the integrated value of power actually charged in the battery, is calculated based on the difference between the charged power and the consumed power. Therefore, the accuracy of the determination can be enhanced remarkably, as compared with a system in which it is determined whether the stopping of the engine is possible, based on the remaining capacity of the battery which varies depending on various conditions such as a variation in temperature and the state of deterioration of the battery.

According to another aspect of the present invention, in addition to the arrangement described above, there is provided a system for automatically stopping and starting an engine of a vehicle wherein even if the integrated value calculated by the charged power integrated value calculating means is equal to or larger than the integrated value evaluated by the consumed power integrated value evaluating means as a result of the comparison provided by the comparing means, the engine is started when the duration of stoppage of the engine has reached the target time.

With the above arrangement, when the duration of stoppage of the engine is equal to or larger than the target time, the engine is started. Therefore, it is possible to avoid a situation in which the battery is discharged during stoppage of the engine, thereby causing the starting of the engine to be impossible. It is also possible to avoid a situation in which the battery is deteriorated due to its secular change, thereby causing the starting of the engine to be impossible.

DETAILED DESCRIPTION OF THE PREFERRED EMBODIMENTS

The best mode for carrying out the present invention will now be described by way of preferred embodiments of the present invention shown in the accompanying drawings.

FIGS. 1 to 5 show a first embodiment of the present invention.

Figure 1:
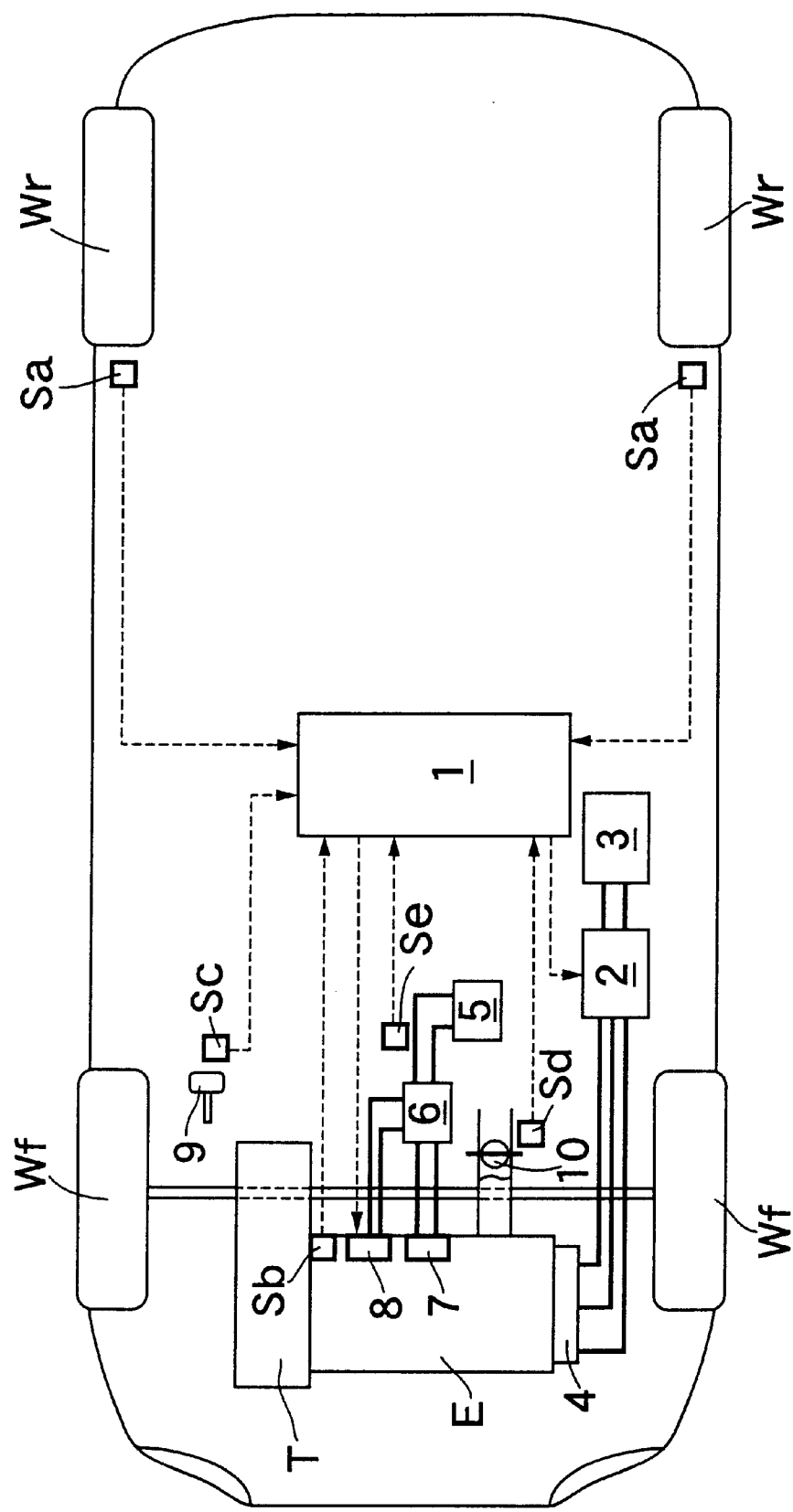
FIG. 1 is an illustration of the entire arrangement of a vehicle.

As shown in FIG. 1, a vehicle includes an engine E, and a driving force from the engine E is transmitted through an automatic transmission T to front wheels Wf, Wf, which are driven wheels. A starter motor 4 for starting the engine E is driven by a powered drive unit 2 connected to an electronic control unit 1 comprising a microcomputer. A high-voltage battery 3 of 42 volts is connected to the starter motor 4 through the powered drive unit 2. The starter motor 4 connected directly to a crankshaft of the engine E also functions as a generator. The high-voltage battery 3 is charged with a power generated by the starter motor 4 by driving the starter motor 4. The power generated by the starter motor 4 is provided either by the engine E driving the starter motor 4, or by regenerative braking forces transmitted through the engine E to the starter motor 4 (driving forces transmitted from the front wheels Wf, Wf back to the engine E during deceleration of the vehicle).

A low-voltage battery 6 of 12 volts for supplying a power to various auxiliaries 5 such as an air conditioner, lights, a car stereo and the like and a fuel injection control device 8 is charged by a generator 7 driven by the engine E.

The electronic control unit 1 controls the stopping of the idling of the engine E by fuel cut provided by the fuel injection control device 8 depending on the state of the low-voltage battery 6, and controls the restarting of the engine E provided by the starter motor 4. For this purpose, the following signals are input to the electronic control unit 1: a signal from a vehicle speed sensor Sa for detecting a vehicle speed based on rotational speeds of rear wheels Wr, Wr as follower wheels; a signal from an engine rotational speed sensor Sb for detecting a rotational speed of the engine; a signal from a brake switch Sc for detecting the operation of a brake pedal 9; a signal from a throttle opening degree sensor Sd for detecting an opening degree of a throttle valve 10; and a signal from a consumed power sensor Se for detecting a quantity of power consumed by the various auxiliaries 5 (namely, a quantity of power brought out from the low-voltage battery 6 to the auxiliaries 5).

In a common vehicle, the fuel cut is conducted during deceleration of the vehicle, and when the engine rotational speed is reduced to the idling rotational speed, the fuel cut is discontinued to restart the supplying of the fuel in an amount permitting an idling operation to be maintained so that the engine E may not be stopped. In the present embodiment, however, when a predetermined condition is established, the engine E is stopped without restarting the supply of fuel subsequent to the fuel cut. When the predetermined condition is not established, the restarting of the supply of fuel is conducted to restart the engine E. In this manner, the engine E is stopped to the utmost during the idling operation to provide a further preservation in the amount of fuel consumed.

The operational state of the vehicle in the present embodiment is switched over from one of the following five modes to another: a running mode; an idling mode; a stopping mode; a going mode and a starting mode.

The running mode is a mode in which the usual running of the vehicle by the engine E is conducted, and during this time, the starter motor 4 causes the generation of power to be conducted by the engine E or by the regenerative braking to charge the high-voltage battery 3. The idling mode is a mode in which the idling operation of the engine E is conducted, and during this time, the starter motor 4 causes the generation of power to be conducted by the engine E to charge the high-voltage battery 3. The stopping mode is a mode in which the engine E is stopped without conducting the idling operation, and the starter motor 4 causes the generation of power to be conducted by the regenerative braking during deceleration of the vehicle to charge the high-voltage battery 3. The going mode is a mode in which the engine E with its idling suspended is restarted. The restarting mode is a mode in which the going mode is passed to the running mode.

The selection of any of the five modes will be described below with reference to a flow chart shown in FIG. 2.

First, a vehicle speed VP detected by the vehicle speed sensor Sa is compared with a vehicle speed threshold value VIDLE for determining the idling mode at Step S1, and when the vehicle is traveling at a high speed at which a relation, $VP \leq VIDLE$ is not established, the running mode is selected at Step S15. Also, a throttle opening degree THA detected by the throttle opening degree sensor Sd is compared with a throttle opening degree threshold value THSIDLE for determining the idling mode at Step S2, when the opening degree is a high value at which a relation, $THA \leq THSIDLE$ not established, the running mode is selected at Step S15.

When the vehicle is traveling at a low speed at which the relation, $VP \leq VIDLE$ is established at Step S1, and when the throttle opening degree is a low value at which $THA \leq THSIDLE$ is established at Step S2, a flag F_MOTSTB for determining the starting of a high-voltage system is referred to at Step S3. The flag F_MOTSTB for determining the starting of the high-voltage system indicates whether the starter motor 4 driven by the high-voltage battery 3 of 42 volts is being started, or is on standby. If the starter motor 4 is on standby with F_MOTSTB=0, the idling mode is selected at Step S14 without stopping of the idling.

If F_MOTSTB=1 is established at Step S3, which indicates that the starter motor 4 is being started, a flag F_STOPENA for determining the passage of the running mode is referred to at Step S4. When the running mode has been never passed with F_STOPENA=0, the idling mode is likewise selected at Step S14 without stopping of the idling. The flag F_STOPENA for determining the passage of the running mode is reset at "0" in the starting mode and then set at "1" in the running mode. In other words, the flag F_STOPENA for determining the passage of the running mode is once reset at "0" after starting of the engine E, and set at "1" when it is determined that the vehicle has actually been traveling in the running mode.

When F_STOPENA=1 is established at Step S4, indicating that the running mode has been passed at least once, a timer TMIDLE for determining the lapse of a predetermined time in the idling mode is referred to at Step S5. If the predetermined time has not lapsed after establishment of the idling mode with TMIDLE≠0, the idling mode is further continued at Step S14. It should be noted that the timer TMIDLE for determining the lapse of a predetermined time in the idling mode is set at a default value IDLE in the idling mode.

When the predetermined time has lapsed after establishment of the idling mode with the timer TMIDLE for determining the lapse of a predetermined time in the idling mode being equal to 0 (TMIDLE=0) at Step S5, the stopping mode is selected at Step S9 to stop the engine E, 1) if the last mode is not the going mode at Step S6; 2) the brake switch Sc is in a turned-on state at Step S7, indicating that a driver has no intention to travel the vehicle; and 3) a flag F_ATOK indicating the completion of the preparation of the automatic transmission is equal to 1, thereby enabling the shifting of the automatic transmission T.

If the brake switch Sc is not in the turned-on state at Step S7 and the last mode is not the stopping mode at Step S10, then the idling mode is further continued at Step S14. When the last mode is the stopping mode at Step S10, or when the last mode is going mode at Step S6, the processing is passed to Step S11, at which a timer TMGO for determining the lapse of a predetermined time in the going mode is referred to. As a result, if TMGO≠0, indicating that the predetermined time is not lapsed after the establishment of the going mode, the going mode is selected or continued, to start the engine E by the starter motor 4. If TMGO=0 at Step S11, indicating that the predetermined time has lapsed after the establishment of the going mode, the going mode is shifted to the starting mode.

Figure 2:
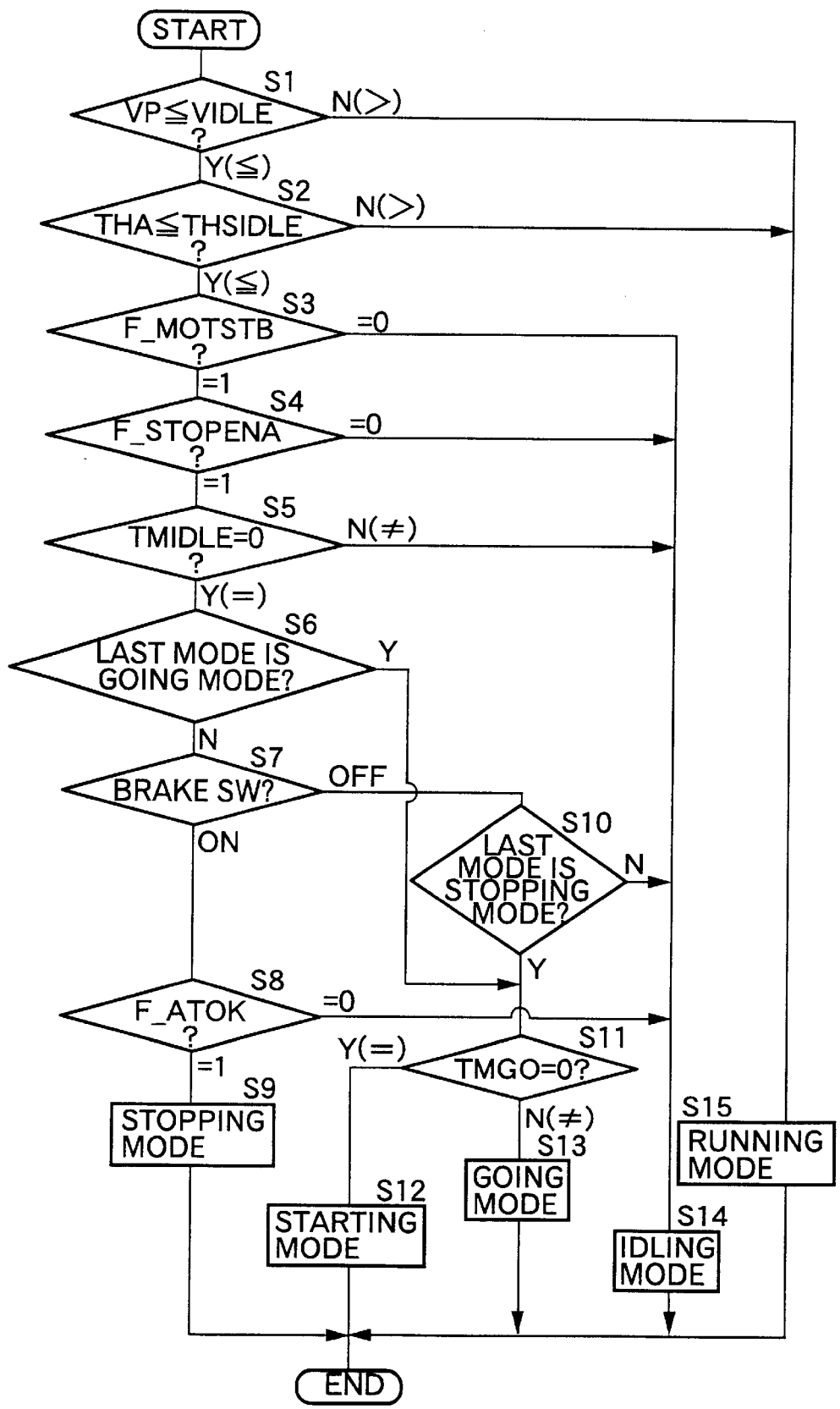
FIG. 2 is a flow chart of a mode-changing routine.

When the stopping mode is selected at Step S9 in the flow chart shown in FIG. 2, it is determined whether the engine E may be stopped in accordance with the state of the low-voltage battery 6. This is because if the engine E is stopped when the state of the low-voltage battery 6 cannot withstand the restarting of the engine E, there is a possibility that it is difficult to restart the engine.

Therefore, in the present embodiment, a circuit for determining whether the stopping of the engine is possible, is provided in the electronic control unit 1, so that it is determined whether the engine can be stopped.

Figure 5:
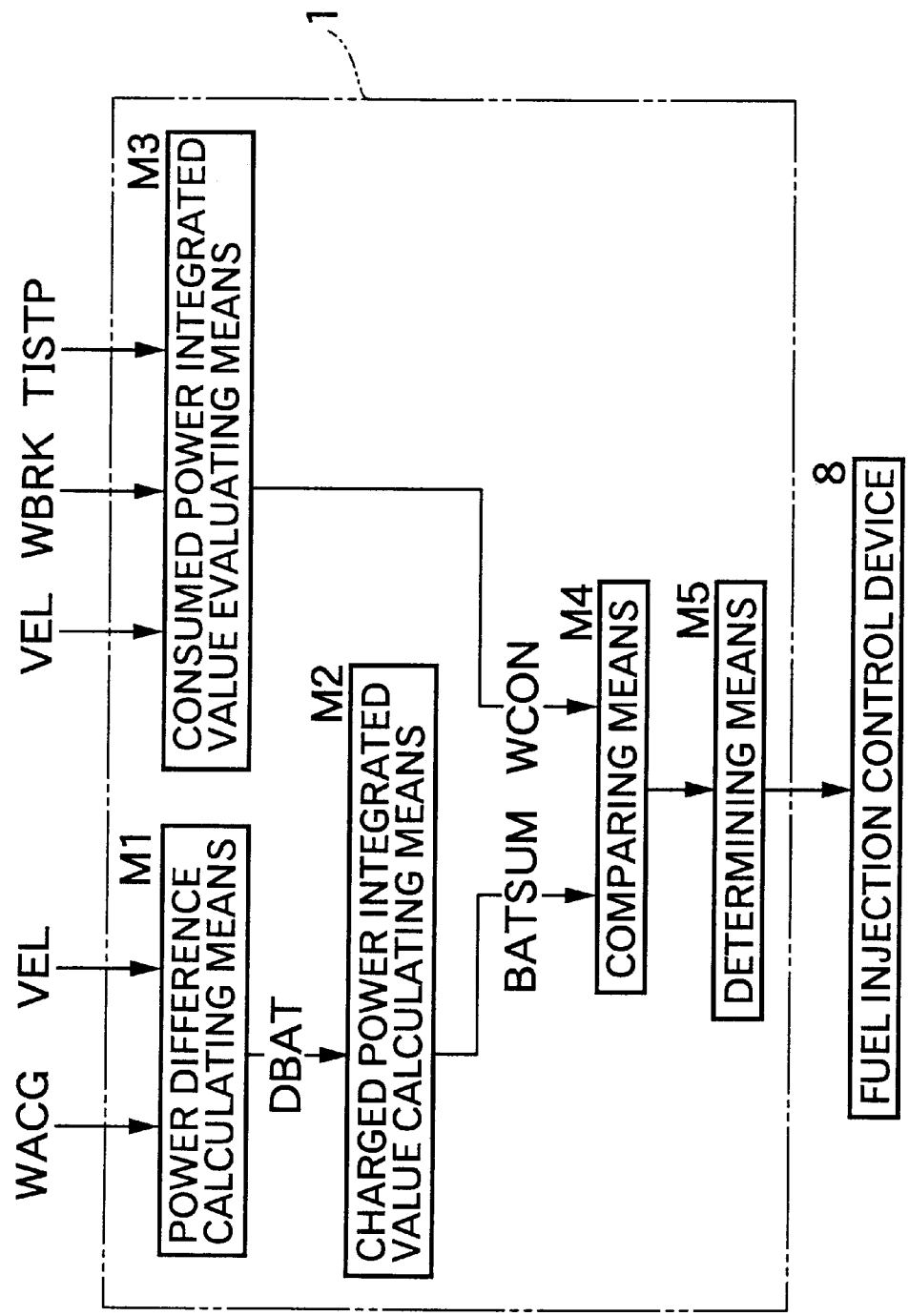
FIG. 5 is a block diagram of a circuit provided in an electronic control unit for determining whether the stopping of the engine is possible.

As shown in FIG. 5, the circuit provided in the electronic control unit 1 for determining whether the stopping of the engine is possible, includes a power difference calculating means M1, a charged power integrated value calculating means M2, a consumed power integrated value evaluating means M3, a comparing means M4 and a determining means M5. The operation of the circuit for determining whether the stopping of the engine is possible will be described below with reference to a flow chart shown in FIG. 3.

When an ignition switch IG is in a turned-off state at the last time at Step S21, namely, when this is the first time that the ignition switch has been turned on, an integrated value BATSUM of power charged in the battery is set at a default value of 0 (zero) at Step S28, and the stopping of the engine E is prohibited at Step 29.

Figure 4:
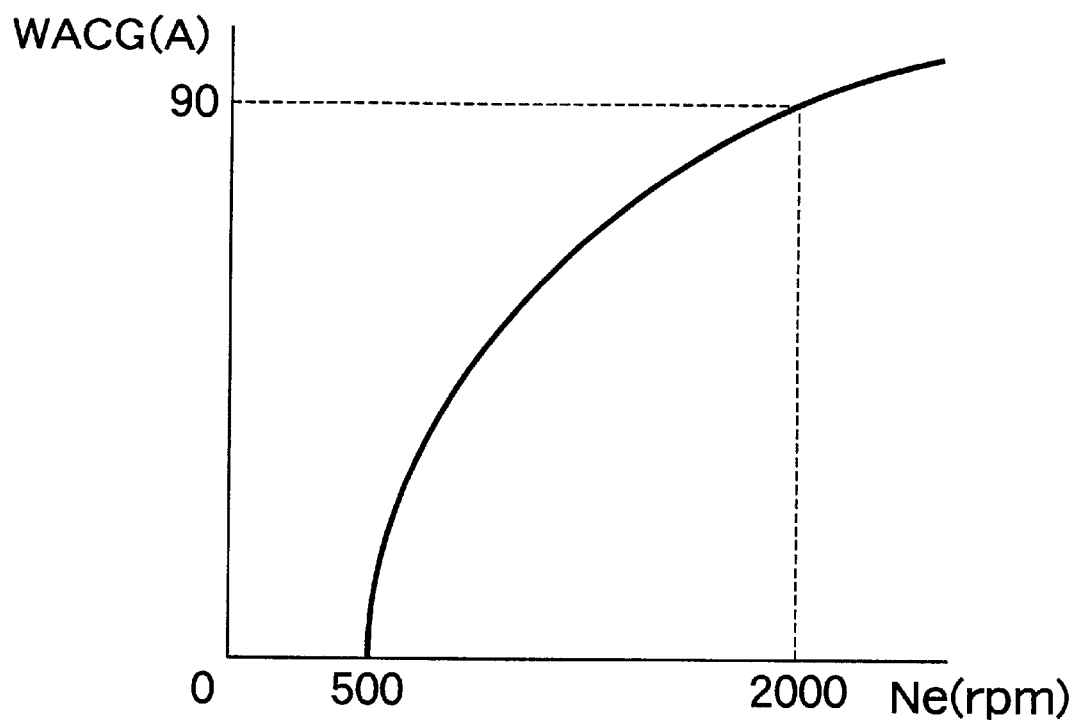
FIG. 4 is a diagram showing a table for searching a quantity of power generated by a generator from a rotational speed of the engine.

When the ignition switch IG has been turned on at the last time at Step S21, namely, in a second or subsequent loop after the first turning-on of the ignition switch, an engine rotational speed Ne detected by the engine rotational speed sensor Sb is utilized in a table shown in FIG. 4 to search a power WACG generated by the generator 7 corresponding to the engine rotational speed Ne at Step S22. At subsequent Step S23, the power difference calculating means M1 subtracts, from the power WACG generated by the generator 7, a power VEL consumed by the auxiliaries 5 and detected by the consumed power sensor Se, i.e., a consumed power VEL brought out from the low-voltage battery 6 by the auxiliaries 5, thereby calculating a difference between the power WACG generated by the generator 7 and the power VEL consumed by the auxiliaries 5. The difference DBAT corresponds to a power for actually charging the low-voltage battery 6. At subsequent Step S24, the charged power integrated value calculating means M2 calculates a current value BATSUM of charged power integrated value by adding the difference DBAT to a last value BATSUM(n−1) of charged power integrated value.

At subsequent Step S25, the consumed power integrated value evaluating means M3 evaluates an evaluated integrated value WCON of power consumed by the battery during stoppage of the idling, by multiplying a value resulting from addition of a known power WBRK consumed by a brake lamp to a power VEL consumed at the current time point by the auxiliaries 5 and detected by the consumed power sensor Se, by a target value TISTP (for example, 120 sec) of idling-stoppage duration beforehand determined. At Step S26, the comparing means M4 compares the integrated value BATSUM of power consumed by the battery with the evaluated integrated value WCON of power consumed by the battery during stoppage of the idling. As a result, if BATSUM≧WCON, the determining means M5 determines that the starter motor 4 can be operated by the high-voltage battery 3 to restart the engine E even after the lapse of the target value TISTP of idling-stoppage duration, whereby the stopping of the engine E is permitted at Step S27. On the other hand, if BATSUM<WCON at Step S26, the determining means M5 determines that there is a possibility that it is impossible to operate the starter motor 4 by the high-voltage battery 3 to restart the engine E after the lapse of the target value TISTP of idling-stoppage duration, whereby the stopping of the engine E is prohibited at Step S29.

Even during continuation of the stopping mode, when the integrated value BATSUM of power consumed by the battery is smaller than the evaluated integrated value WCON of power consumed by the battery during stoppage of the idling at Step S26 to prohibit the stopping of the idling, the starter motor 4 is driven immediately to start the engine E.

As described above, while the integrated value of power charged in the low-voltage battery 6 is calculated by the charged power integrated value calculating means M2, the integrated value of power which would be brought out from the low-voltage battery 6 for a beforehand determined idling-stoppage duration is evaluated by the consumed power integrated value evaluating means M3. If the integrated value of power charged in the low-voltage battery 6 is equal to or larger than the integrated value of power estimated to be brought out from the low-voltage battery 6 for the beforehand determined idling-stoppage duration, the stopping of the engine E is permitted. Therefore, it is possible to reliably avoid such a situation that the fuel injection control device 8 or an ignition device cannot be operated due to a lack of capacity of the low-voltage battery 6 after the stopping of the engine E, thereby making it difficult to restart the engine E, while suppressing the capacity of the low-voltage battery 6 for starting engine E to the necessary minimum, and carrying out the stopping of the idling of the engine E as much as possible to preserve fuel.

Moreover, it is determined whether the stopping of the engine E is possible, based on the integrated value BATSUM of power actually charged in the low-voltage battery 6, rather than based on the remaining capacity of the low-voltage battery 6 which varies depending on a variation in temperature and the degree of deterioration of the battery and hence, the determining accuracy can be enhanced remarkably.

A second embodiment of the present invention will now be described with reference to FIG. 6.

Figure 3:
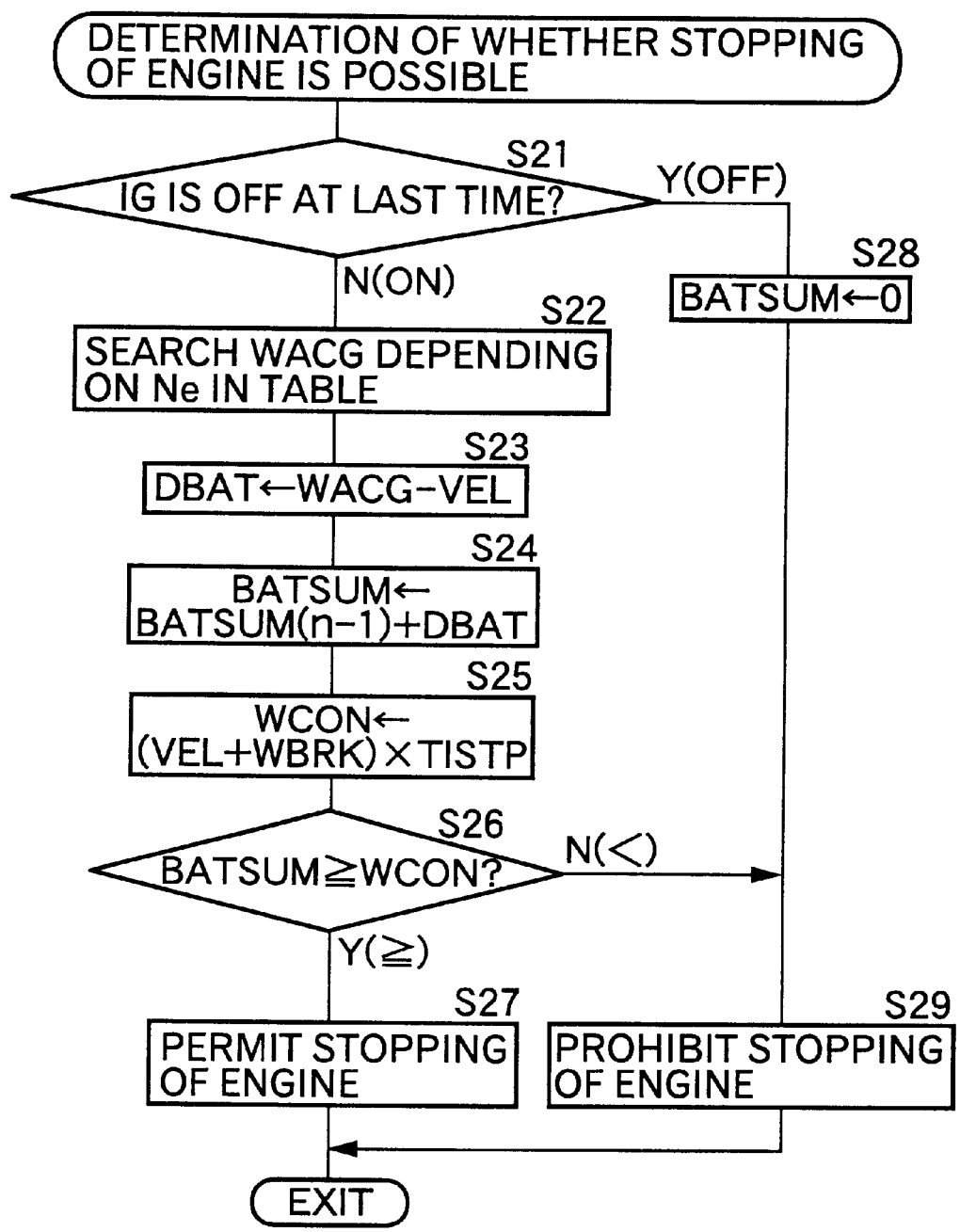
FIG. 3 is a flow chart of a routine for determining whether stopping of an engine is possible.
Figure 6:
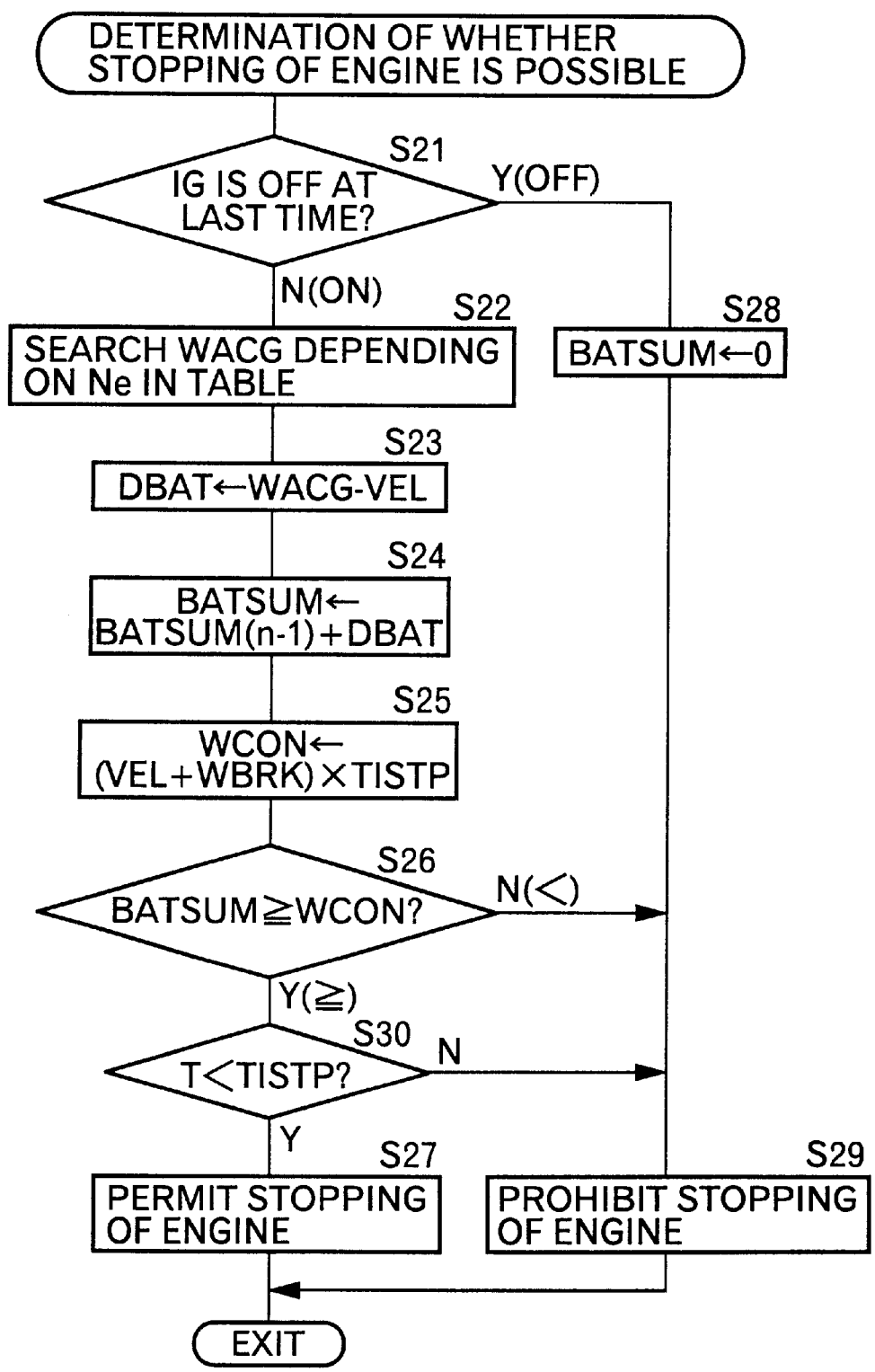
FIG. 6 is a flow chart similar to FIG. 3, but according to a second embodiment of the present invention.

As can be seen from comparison of FIG. 6 with FIG. 3 (the first embodiment), in the second embodiment, Step S30 is newly added between Step S26 and Step S27, and the other Steps are the same as in the first embodiment.

At Step S26, the comparing means M4 compares an integrated value BATSUM of power consumed by the battery with an evaluated integrated value WCON of power consumed by the battery during stoppage of the idling. Even if BATSUM≧WCON, at the subsequent Step 30, a count value of a timer T which starts counting up simultaneously with the stopping of the engine E is compared with the target value TISTP (for example, 120 sec) of idling-stoppage duration. When the count value is smaller than the target value TISTP of idling-stoppage duration, the stopping of the engine E is permitted at Step S27. When the count value is equal to or larger than the target value TISTP of idling-stoppage duration, the stopping of the engine is prohibited at Step S29, whereby the engine E is started.

According to the present embodiment, if the target value TISTP of idling-stoppage duration has lapsed after stoppage of the engine E, the engine E is started automatically. Therefore, it is possible to avoid a situation in which the starting of the engine is impossible, not only when the power consumed by the low-voltage battery 6 and the power charged in the low-voltage battery 6 are imbalanced by reason that the duration of stoppage of the engine E exceeds the target value TISTP of idling-stoppage duration, but also when the low-voltage battery has been deteriorated due to its secular change.

Although the embodiments of the present invention have been described in detail, it will be understood that various modification in design may be made without departing from the subject matter of the invention.

For example, the same Step as Step S30 in FIG. 6 may be added between Step S8 and Step S9 in the flow chart shown in FIG. 2. Thus, because the engine E is started automatically when the target value TISTP of idling-stoppage duration has lapsed after stoppage of the engine E, it is possible to avoid a situation in which the low-voltage battery 6 is discharged during stoppage of the engine E, thereby making it impossible to start the engine E.

In the embodiments, the vehicle using only the engine E as a traveling drive source has been exemplified, but the present invention is applicable to a hybrid vehicle using an engine E and a traveling motor as traveling drive sources. In this case, the traveling motor can be also used as a starter motor.

In addition, the target value TISTP of idling-stoppage duration has been set at 120 sec in the embodiments, but may be varied as desired.

As discussed above, according to one aspect of the present invention, while the differences between the power charged in the battery and the consumed power brought out from the battery are integrated to calculate the integrated value of power charged in the battery, the integrated value of power brought out from the battery when the stoppage of the engine is continued for the target time is evaluated. When the integrated value of power charged in the battery is equal to or larger than the integrated value of power brought out from the battery during stoppage of the engine, the stopping of the engine is permitted. Therefore, it is possible to reliably prevent the restarting of the engine from being impossible due to a lack of capacity of the battery after stopping of the engine. As a result, the capacity of the battery can be suppressed to the necessary minimum, and the engine can be stopped as much as possible to preserve fuel. Particularly, the integrated value based on which it is determined whether the stopping of the engine is possible, namely, the integrated value of power actually charged in the battery, is calculated based on the difference between the charged power and the consumed power. Therefore, the accuracy of the determination can be enhanced remarkably, as compared with a system in which it is determined whether the stopping of the engine is possible, based on the remaining capacity of the battery which varies depending on various conditions such as a variation in temperature and the state of deterioration of the battery.

According to another aspect of the present invention, when the duration of stoppage of the engine is equal to or larger than the target time, the engine is started. Therefore, it is possible to avoid a situation in which the battery is discharged during stoppage of the engine, thereby causing the starting of the engine to be impossible, and a situation in which the battery is deteriorated due to its secular change, thereby causing the starting of the engine to be impossible.

What is claimed is:

1. A system to control stopping and restarting an engine of a vehicle, said system comprising:

a power difference calculating means for calculating a difference between a power charged in a battery in accordance with the operational state of the engine and a first consumed power brought out from the battery;

a charged power integrated value calculating means for calculating an integrated value of the differences calculated by the power difference calculating means;

a consumed power integrated value evaluating means for evaluating an integrated value of the first consumed power and a second consumed power brought out from the battery for a target time when the stoppage of the engine has been continued for the target time;

a comparing means for comparing the integrated value calculated by said charged power integrated value calculating means with the integrated value evaluated by said consumed power integrated value evaluating means; and a determining means for determining whether the stopping of the engine is possible, based on the result of the comparison in the comparing means.

2. A system to control stopping and restarting an engine of a vehicle according to claim 1, wherein if the integrated value calculated by said charged power integrated value calculating means is equal to or larger than the integrated value evaluated by said consumed power integrated value evaluating means as a result of the comparison provided by said comparing means, the engine is started when the duration of stoppage of the engine has reached said target time.

3. A system to control stopping and restarting of an engine, comprising:

charged power integrated value calculating means for calculating a charged power integrated value representing power currently present in a battery;

consumed power integrated value evaluating means for determining an estimated consumed power integrated value representing power to be brought out from the battery for an idling-stoppage duration; and determining means for determining stoppage of the engine when the charged power integrated value is greater than or equal to the estimated consumed power integrated value.

4. A system to control stopping and restarting of an engine according to claim 3, wherein said determining means restarts the engine after the engine was stopped for the idling-stoppage duration.

5. A system to control stopping and restarting of an engine according to claim 3, wherein said charged power integrated value calculating means calculates the charged power integrated value based on a sum of a previous battery power value plus a difference between a generated power and a power consumed by an auxiliary device, the generated power being related to a current rotational speed of the engine.

6. A system to control stopping and restarting of an engine according to claim 3, wherein said consumed power integrated value evaluating means determines the estimated consumed power integrated value based on a sum of a power consumed by a brake lamp and a power consumed by an auxiliary device, for the period of the idling-stoppage duration.

* * * * *